(12) United States Patent
Thermond (10) Patent No.: US 7,133,645 B2
(45) Date of Patent: Nov. 7, 2006

(54) TRANSCEIVER WITH OPTIMAL ANTENNA DIRECTION INDICATORS

(75) Inventor: Jeffrey L. Thermond, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 92 days.

(21) Appl. No.: 10/840,780

(22) Filed: May 6, 2004

(65) Prior Publication Data

US 2005/0250543 A1 Nov. 10, 2005

(51) Int. Cl.
*H04B 17/00* (2006.01)
(52) U.S. Cl. ................. 455/67.7; 455/67.11; 455/63.4; 455/562.1; 343/702; 343/703
(58) Field of Classification Search ............. 455/562.1, 455/277.2, 67.7, 65, 67.11, 63.4; 343/702, 343/703
See application file for complete search history.

(56) References Cited

U.S. PATENT DOCUMENTS 3,159,136 A * 12/1964 Finken ....................... 116/316

4,803,412 A * 2/1989 Burton ........................ 318/567
2004/0204102 A1* 10/2004 Kuehnel et al. ......... 455/562.1
2005/0003873 A1* 1/2005 Naidu et al. ............. 455/575.7

* cited by examiner

*Primary Examiner*—Lester G. Kincaid
*Assistant Examiner*—Dung Lam
(74) *Attorney, Agent, or Firm*—Garlick Harrison & Markison; James A. Harrison (57) ABSTRACT

A wireless access point includes, in one embodiment, circuitry with a radio transceiver that determines substantially optimal antenna orientation for one or more radio hosts with which an access point is in communication. Received RF signals are down-converted to baseband frequencies and produced to a baseband processor. At least one received signal strength indicator provides signal strength measurements for received communication channels to the baseband processor in the described embodiment. The baseband processor produces control signals to prompt the user to orient at least one antenna into a specified location. In one embodiment, logic prompts the user to move the antenna into a plurality of positions and then evaluates signal strength indication in each position to determine an overall substantially optimal orientation for all of the radio transceivers in communication with the access point.

18 Claims, 8 Drawing Sheets

TRANSCEIVER WITH OPTIMAL ANTENNA DIRECTION INDICATORS

BACKGROUND

1. Technical Field

The present invention relates to wireless communications and, more particularly, wireless communication system base stations and access points.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, Advanced Mobile Phone Services (AMPS), digital AMPS, Global System for Mobile Communications (GSM), Code Division Multiple Access (CDMA), Local Multipoint Distribution Systems (LMDS), Multipoint Multichannel Distribution Services (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the Public Switched Telephone Network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The baseband signals are mixed with one or more local oscillations to produce RF signals either directly or through an intermediate frequency stage. The power amplifier amplifies the RF signals prior to transmission via an antenna.

As is also known, the receiver is coupled to the antenna and includes a low noise amplifier, one or more optional intermediate frequency stages, a filtering stage, and a data recovery stage. The low noise amplifier receives an inbound RF signal via the antenna and amplifies it. The one or more intermediate frequency stages (if present) mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard.

To carry out filtering at the intermediate frequencies, Surface Acoustic Wave (SAW) filters are commonly used. The SAW filters have the drawback, however, of being bulky, heavy and expensive. An alternate approach to using a higher intermediate frequency that requires the SAW filters is to convert the RF signal to an intermediate frequency sufficiently low to allow the integration of on-chip channel selection filters. For example, some narrow band or low data rate systems, such as Bluetooth, use this low intermediate frequency design approach. This approach is advantageous in that the use of an intermediate conversion step is avoided.

In a wireless local area network, one common challenge is to maximize the effectiveness of the communication channels to each communication device wirelessly communicating with the access point. Generally, however, structural interference and multi-path interference within a building or dwelling reduce effectiveness of one or more communication links. Moreover, antennas are somewhat directional thereby resulting in signal quality being reduced or improved based upon antenna placement and orientation. Accordingly, it is common for a user to continuously move an access point or host device into different locations and/or orientations to find a placement for which each communication device, in its current location, may establish a communication link between the host and the access point. Generally, however, determining a satisfactory location and orientation of the host or access point is a hit or miss proposition. Moreover, while a location may be determined as satisfactory, the quality of the communication link may not be optimal thereby potentially reducing throughput rates and overall signal quality. What is needed, therefore, is a system and method for indicating, to a user of a base station, an access point or a WLAN host device, of an antenna orientation for a given position that substantially maximizes signal quality to each communication device communicatively coupled to the base station or access point.

SUMMARY OF THE INVENTION

One embodiment of the present invention includes a single chip radio transceiver which includes circuitry that enables received wideband RF signals to be down-converted to baseband frequencies while also evaluating one of a signal quality metric or a received signal strength indication to provide feedback to a user to enable the user to determine an optimal antenna orientation for a given location of a base station or access point. More specifically, an RF signal is initially received in a receiver, is amplified and is produced to a mixer for down-conversion with a local oscillation signal. The down-converted baseband signal is then produced to a baseband processor. Additionally, in one embodiment, at least one Received Signal Strength Indicator (RSSI) provides a received signal strength indication to the baseband processor, or more generally, to a processing module. The baseband processor thereafter determines a substantially optimal antenna orientation. More specifically, the baseband processor includes logic to provide prompts to a user to orient at least one antenna into a plurality of orientations and logic to evaluate received signal strength indications for each orientation (position) to determine a substantially optimal orientation. In an alternate embodiment, the baseband processor evaluates a signal metric, such as bit error rate or frame error rate, to determine a substantially optimal orientation.

In one specific embodiment, a group of lights in a first set of lights is provided for each antenna, which group of lights of the first set of lights reflects a desired antenna rotation for a corresponding antenna. Additionally, a group of lights in a second set of lights is provided for each antenna, which group of lights of the second set of lights reflects a signal strength for the present upwardly extending position and rotation (collectively, "orientation") of the corresponding antenna. Thus, a user may pivot an antenna in an upwardly extending planar direction for the present rotational position until a maximum signal strength is determined.

The present invention includes logic, therefore, to prompt the user to rotate the antenna from rotational position to rotational position until all rotational positions have been tested. Thereafter, the logic prompts the user to the rotational position that yielded the maximum signal strength. Thereafter, the user may pivot the antenna in the upwardly extending planar direction for the specified rotational position until a maximum signal strength is determined. The resulting orientation then provides the substantially optimal orientation for the corresponding antenna.

As another aspect of the present invention, the above processing is performed based on received signal strength indications for all communication links with a plurality of hosts or other wireless communication devices. In one embodiment, the logic within the baseband processor averages received signal strengths and displays an instantaneous average of all signal strengths for the plurality of communication channels thereby ultimately providing an orientation that is substantially optimal for the plurality of hosts or other wireless communication devices in communication with the base station or access point. Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
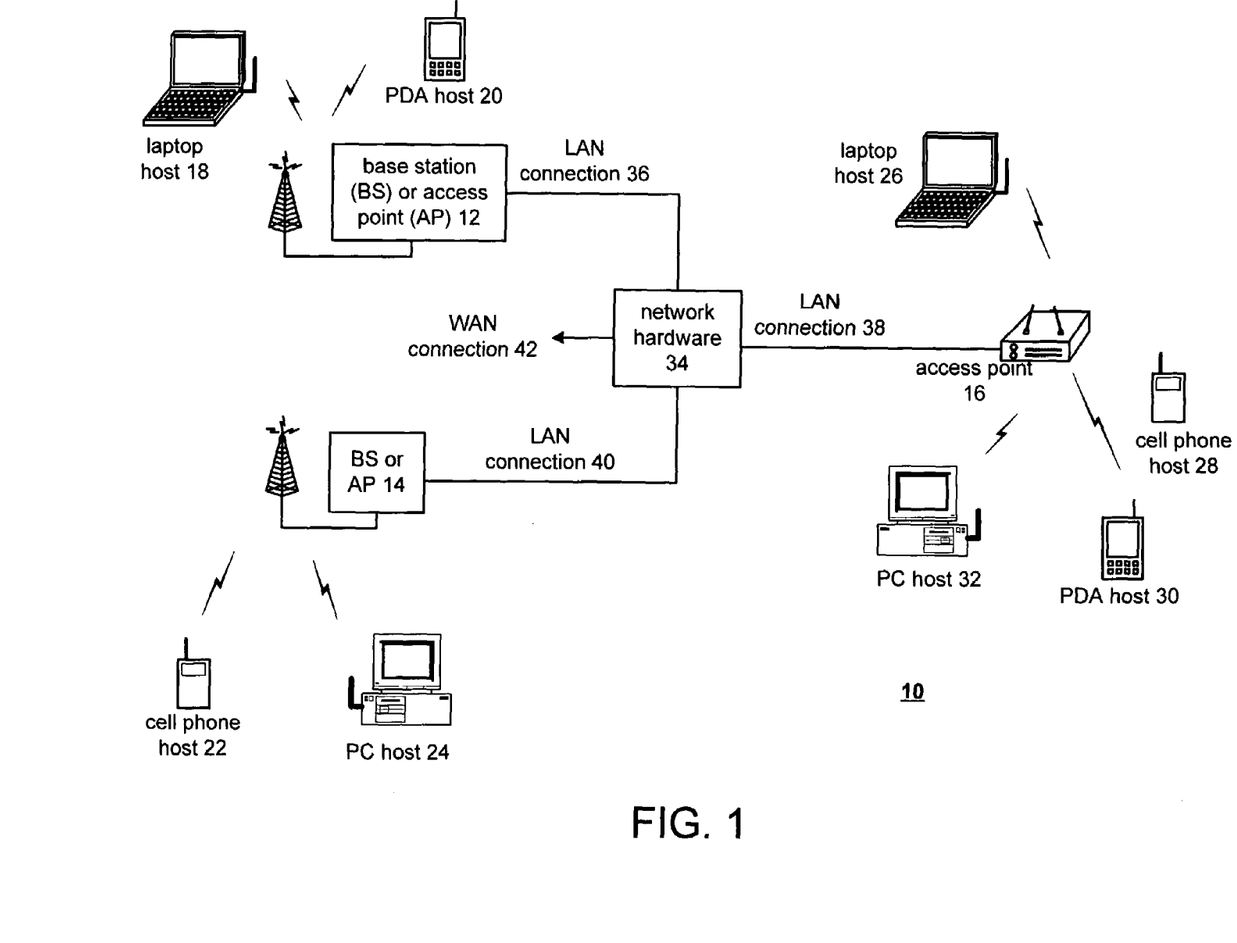
FIG. 1 is a functional block diagram illustrating a communication network that includes a plurality of base stations or access points, a plurality of wireless communication devices and a network hardware component.

FIG. 1 is a functional block diagram illustrating a communication network 10 that includes a plurality of base stations or access points (AP) 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware component 34 via Local Area Network (LAN) connections 36, 38 and 40. The network hardware component 34, which may be a router, switch, bridge, modem, system controller, etc., provides a Wide Area Network (WAN) connection 42 for the communication network 10. Each of the base stations or access points 12–16 has an associated antenna or antenna array to communicate with the wireless communication (host) devices in its area. Typically, the wireless communication devices 18–32 register with the particular base station or access points 12–16 to receive services from the communication network 10. For direct connections (i.e., point-to-point communications), wireless communication devices communicate directly via an allocated channel.

Typically, base stations are used for cellular telephone systems and like-type systems, while access points are used for in-home or in-building wireless networks. Such network elements are operable to communicate with wireless local area network access points and wireless hosts by way of a gateway device or network such as hardware element 34. FIG. 1 therefore illustrates one aspect of the present invention in that the embodiments of the present invention are particularly useful in smaller wireless network environments having readily adjustable antenna configurations, but that such devices may operatively couple to a larger network as shown in FIG. 1. Generally, the embodiments of the invention provide for access points that include adjustable antennas and an algorithm or logic for determining substantially optimal antenna configurations to improve channel strength. The improved channel strength, therefore, results in higher data rates or larger coverage areas.

Figure 2:
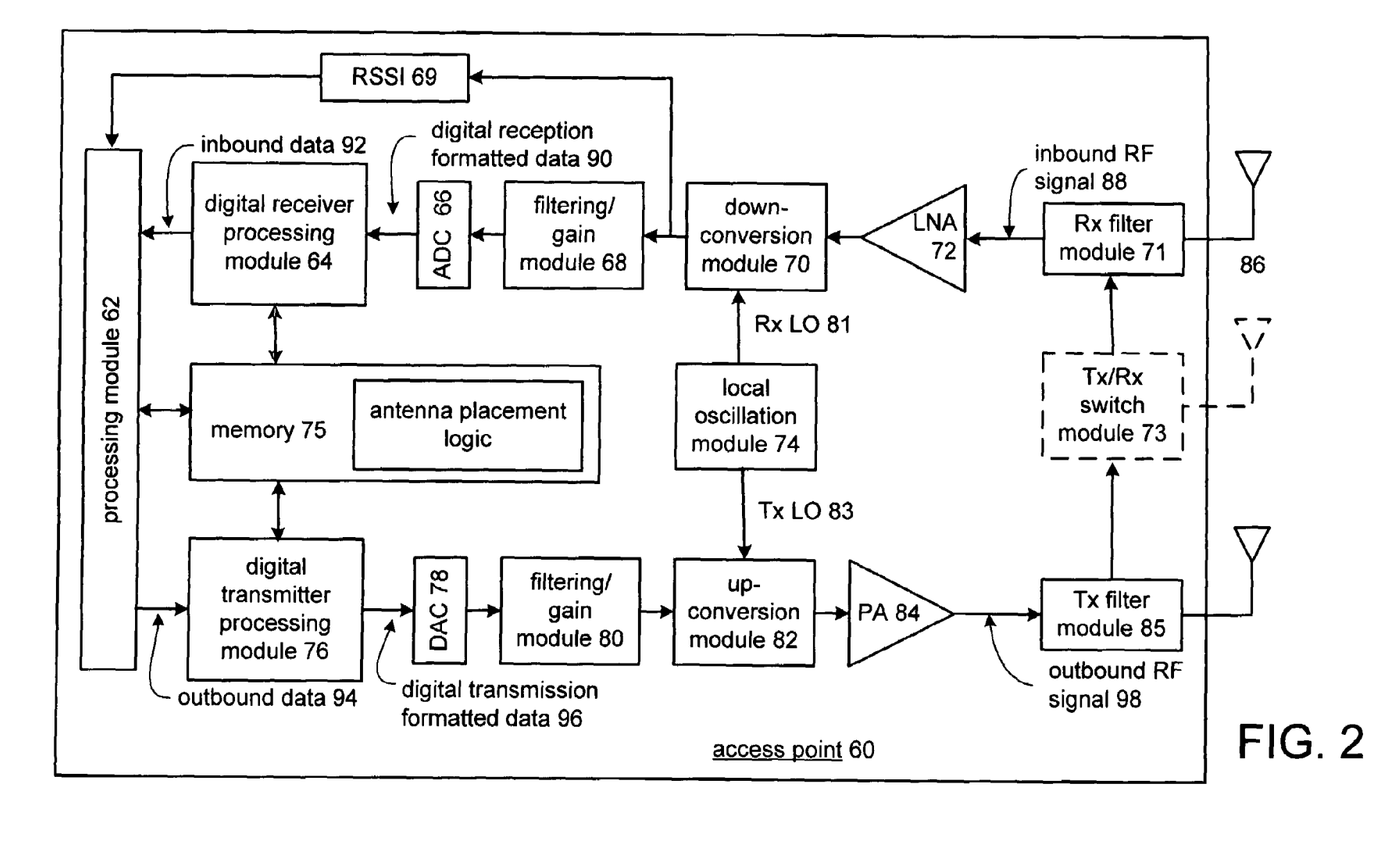
FIG. 2 is a schematic block diagram illustrating an access point formed according to one embodiment of the present invention.

FIG. 2 is a schematic block diagram illustrating an access point formed according to one embodiment of the present invention. For cellular telephone hosts, an access point 60 includes a built-in radio component. As illustrated, access point 60 includes a processing module 62, a digital receiver processing module 64, an analog-to-digital converter 66, a filtering/gain module 68, an RSSI module 69, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. Antenna 86 is shared by the transmit and receive paths as regulated by TX/RX switch module 73. The antenna implementation will depend on the particular standard to which the wireless communication device is compliant.

Processing module 62 is operatively coupled to retrieve computer instructions stored within memory 75, which computer instructions define operational logic of access point 60. The logic defined therein specifically includes instructions that define the operation of the access point as described herein. Processing module 62 retrieves the computer instructions and executes the instructions to cause access point 60 to operate according to the described embodiments of the invention.

Similarly, digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. Digital receiver and digital transmitter processing modules 64 and 76 may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, access point 60 produces outbound data 94 to digital transmitter processing module 76, which processes outbound data 94 in accordance with a particular wireless communication standard (e.g., IEEE 802.11a, IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

The digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation signal 83 provided by local oscillation module 74. Power amplifier 84 amplifies the RF signal to produce an outbound RF signal 98, which is filtered by transmitter filter module 85. A coupled antenna transmits outbound RF signal 98 to a targeted device such as a base station, an access point and/or another wireless communication device. In the described embodiment, a pair of antennas are provided for transmit and receive operations to facilitate communications with a plurality of wireless communication devices or hosts. As may be seen, however, the embodiments of the invention specifically include other antenna configurations, including single antenna configurations.

Outbound data 94 includes, according to one aspect of the present invention, control commands to prompt one or more hosts 18–32 (of FIG. 1) to transmit communication signals to enable access point 60 to measure received signal strengths and to perform the steps of the present embodiments of the inventive method to determine a substantially optimal antenna orientation.

Access point 60 also receives an inbound RF signal 88 via an antenna, which was transmitted by a host or other wireless communication device. The antenna provides the inbound RF signal 88 to the receiver filter module 71, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation signal 81 provided by local oscillation module 74. Down-conversion module 70 provides the inbound low IF signal or baseband signal to filtering/gain module 68 and to RSSI module 69. Filtering/gain module 68 may be implemented in accordance with the teachings of the present invention to filter and/or attenuate the inbound low IF signal or the inbound baseband signal to produce a filtered inbound signal. In the described embodiment, RSSI module 69 receives a signal and noise and measures a signal strength therefor. Alternately, if RSSI module 69 is coupled to the output of filtering/gain module 68, RSSI module 69 merely detects a signal strength for the signal (minus the noise) within the signal band.

Analog-to-digital converter 66 converts the filtered inbound signal from the analog domain to the digital domain to produce digital reception formatted data 90. Digital receiver processing module 64 decodes, descrambles, demaps, and/or demodulates the digital reception formatted data 90 to recapture inbound data 92 in accordance with the particular wireless communication standard being implemented by access point 60.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 are implemented on a second integrated circuit, and the remaining components of access point 60, less antenna 86, may be implemented on a third integrated circuit. As an alternate example, access point 60 may be implemented on a single integrated circuit. Moreover, while FIG. 2 describes an access point 60, the circuit blocks of FIG. 2 also describe any radio transceiver device that includes the antenna placement logic. Thus, the invention described herein may also be formed within a host or other wireless communication device having adjustable antennas and user feedback displays.

Figure 3:
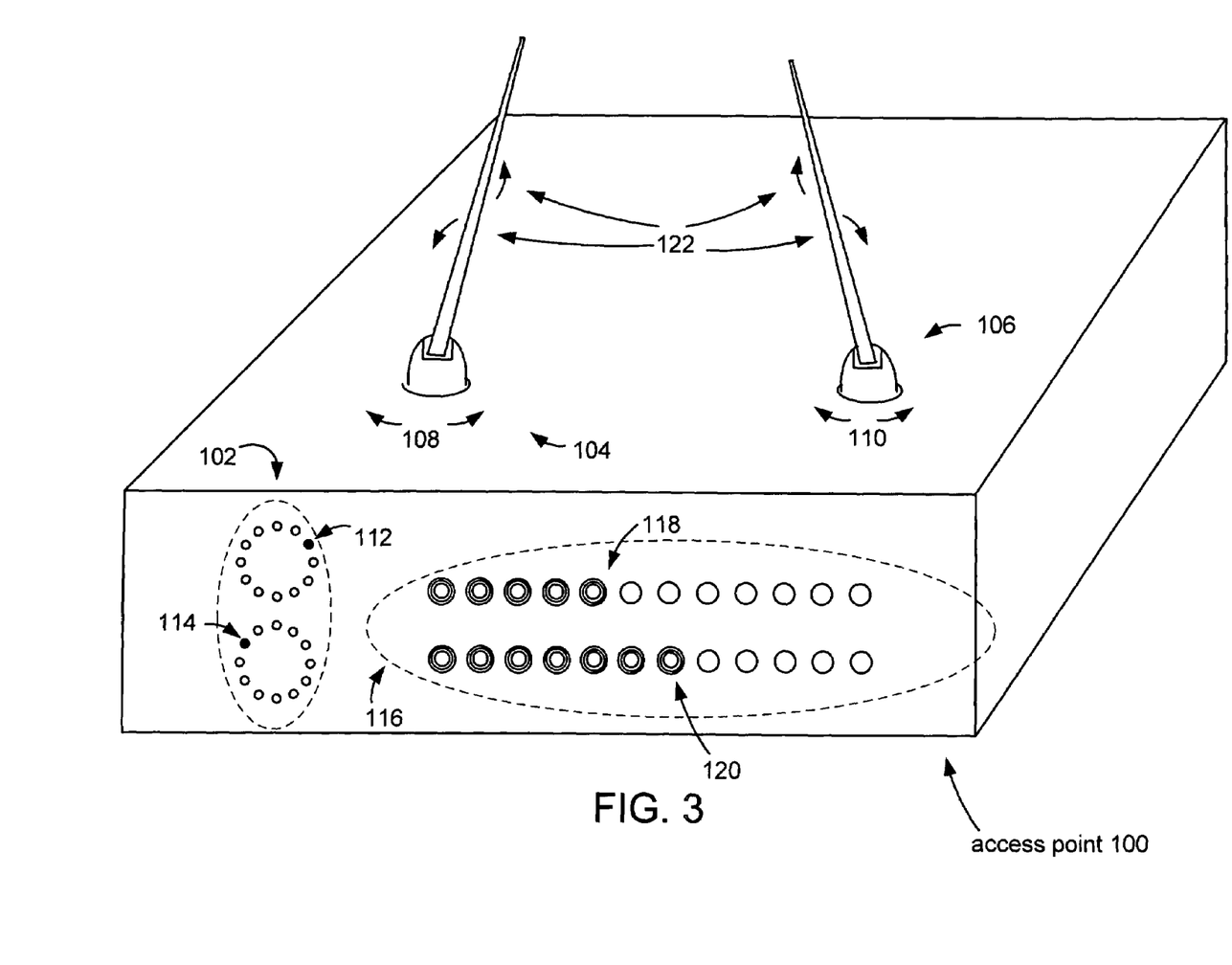
FIG. 3 is a perspective view of an access point formed to operate according to one embodiment of the present invention.

FIG. 3 is a perspective view of an access point formed to operate according to one embodiment of the present invention. Access point 100 includes traditional and new access point circuitry and logic as illustrated with reference to FIG. 2. Additionally, access point 100 includes a first set of lights 102 that correspond to antenna rotational positions. In the described example, access point 100 includes two antennas 104 and 106. Accordingly, the first set of lights 102 includes two groups of lights, one group corresponding to antenna 104 and the other group corresponding to antenna 106. As may be seen, antenna 104 is operable to rotate in a horizontal plane in clockwise and counterclockwise directions 108, while antenna 106 rotates in clockwise and counterclockwise directions 110.

In operation, as will be described in greater detail below, access point 100 illuminates a light in the first set of lights 102 to prompt a user to rotate the corresponding antenna into a specified rotation if the antenna is not already in the specified rotation. Referring to the first set of lights 102, therefore, it may be seen that light 112 is illuminated to prompt the user to rotate antenna 104 into the corresponding position as shown. Similarly, light 114 is illuminated to prompt the user to rotate antenna 106 into the corresponding position as shown.

Access point 100 further includes a second set of lights 116 that further includes a first and second group of lights that correspond to antennas 104 and 106, respectively. In the described embodiment, each group of lights of the second set of lights 116 reflects an overall signal strength for one or more wireless communication devices with which access point 100 is communicating. For example, in one embodiment, if access point 100 is communicating with three host devices through antenna 104, light 118 reflects an average signal strength for received RF signals transmitted by each of the wireless host devices. Similarly, light 120 reflects an average signal strength for host devices in communication with access point 100 by way of antenna 106. For each group of lights of the second set of lights 116, a number of lights are illuminated to correspond to the average received signal strength of communications received through the corresponding antenna. For a given rotational position, each antenna 104 and 106 may be rotated or pivoted in an upwardly extending planar position as shown generally at 122. Thus, each group of lights of the second set of lights 116 will reflect an average signal strength as the antenna is pivoted in direction 122 to enable the user to determine a substantially optimal upwardly extending planar position about a pivot point for a given horizontal orientation for communicating with a single host device or a plurality of host devices.

As will be described in greater detail below, one embodiment of the invention includes operation in a plurality of modes including a setup mode and an operational mode. In one embodiment, the second set of lights reflect instantaneous signal strength to provide feedback to the user to enable the user to determine a substantially optimal antenna orientation. In a "permanent" configuration during an operational mode, the first and second groups of lights of the second set of lights reflect a signal strength of a last reception of a data transmission (in an operational mode). Further, in a typical embodiment, logic within the access point, such as access point 100, selects from a plurality of antennas to use for data communications based upon signal quality and/or signal strength. The second antenna, however, is, in at least one embodiment, used for control operations including scanning operations to determine presence of wireless hosts or communication devices.

Figure 4:
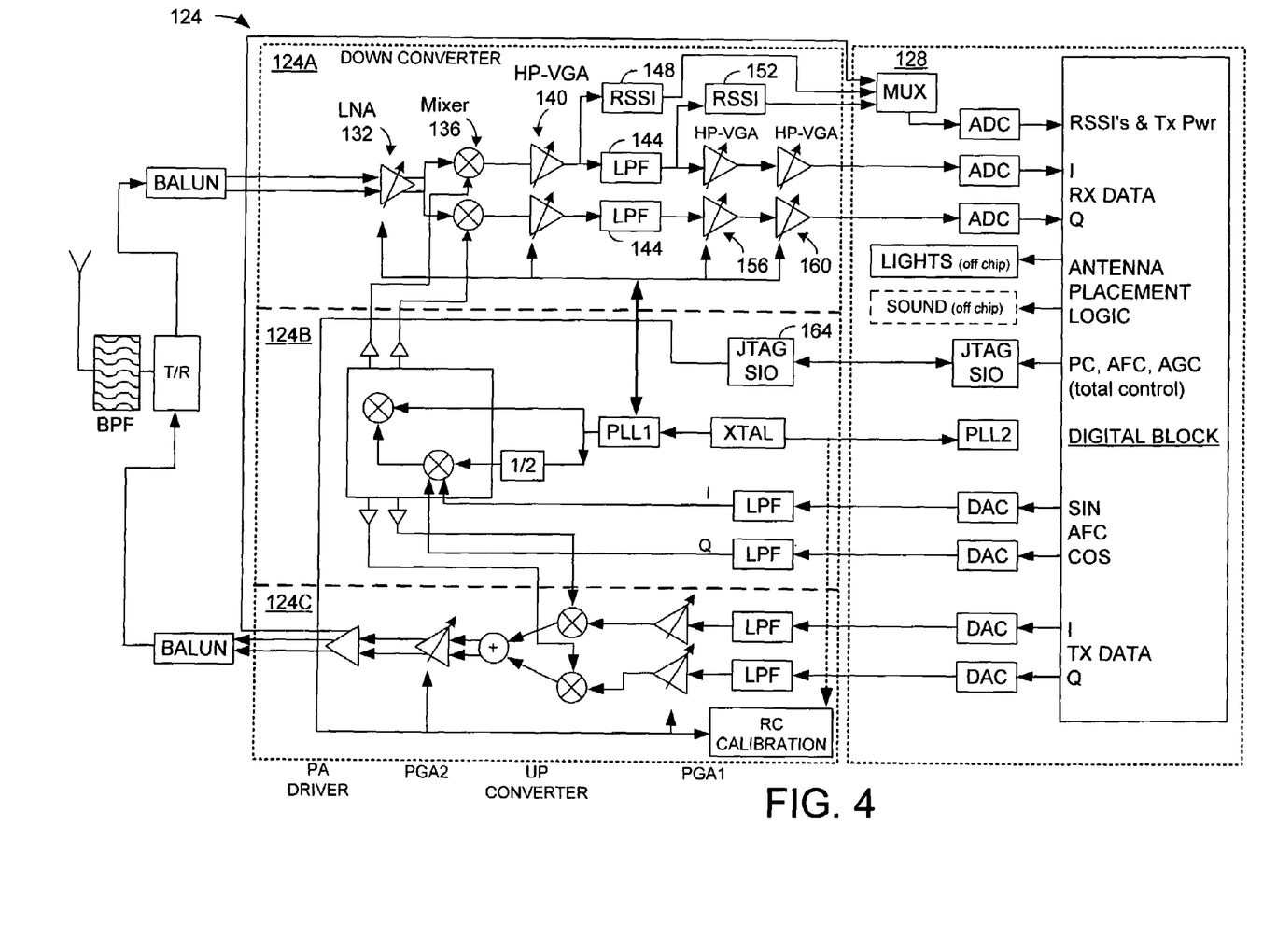
FIG. 4 is a functional schematic diagram of a direct conversion radio transceiver formed according to one embodiment of the present invention.

FIG. 4 is a functional schematic diagram of a direct conversion radio transceiver formed according to an exemplary embodiment of the present invention. Referring now to FIG. 4, a transceiver system formed on a single integrated circuit comprises radio circuitry 124 that is coupled to baseband processing circuitry 128. Radio circuitry 124 performs filtering, amplification, frequency calibration and frequency conversion (down from RF to baseband and up from baseband to RF). As may be seen, single chip radio circuitry 124 is coupled to receive radio signals that are initially received by the transceiver and then converted by a Balun signal converter, which performs single end to differential conversion for the receiver (and differential to single end conversion for the transmitter end). The Balun signal converters are shown to be off chip-in FIG. 4, but they may be formed on-chip with radio circuitry 124 as well. Similarly, while baseband processing circuitry 128 is shown off-chip, it also may be formed on-chip with radio circuitry 124.

Radio circuitry 124 and, more particularly, circuitry portion 124A, includes a low noise amplifier 132 that is coupled to receive RF signals from a transceiver port. Low noise amplifier 132 then produces an amplified signal to mixers 136 that are for adjusting and mixing the RF with a local oscillation signal. The outputs of mixers 136 (I and Q components of quadrature phase shift keyed signals) are then produced to a first HP-VGA 140. The outputs of first HP-VGA 140 are then produced to a first RSSI 148 as well as to a low pass filter 144. The outputs of low pass filter 144 are then produced to a second RSSI 152, as well as to a second HP-VGA 156 and a third HP-VGA 160 as may be seen in FIG. 4.

First RSSI 148 measures the power level of the signal and interference from the first HP-VGAs. Second RSSI 152 measures the power level of the signal only. With respect to routine operation, baseband processing circuitry 128 determines the ratio of the RSSI measured power levels to determine the relative gain level adjustments of the front and rear amplification stages. If the power level of the signal and interference is approximately equal to or slightly greater than the power level of the signal alone, then the first amplification stages are set to a high value and the second amplification stages are set to a low value. Conversely, if the power level of the signal and interference is significantly greater than the power of the signal alone, thereby indicating significant interference levels, the first amplification stages are lowered and the second amplification stages are increased proportionately. According to one aspect of the present invention, however, one or both of the first and second RSSI measurements are used to determine substantially optional antenna placement.

Circuitry portion 124B includes low pass filters for filtering I and Q component frequency correction signals and mixer circuitry for actually adjusting LO signal frequency. The operation of mixers and phase locked loop for adjusting frequencies is known. Circuitry portion 124B further includes JTAG (Joint Test Action Group, IEEE 1149.1 boundary-scan standard) Serial Input/Output (SIO) circuitry 164 for transmitting control signals and information to circuitry portion 124A (e.g., to control amplification levels) and to a circuitry portion 124C (e.g., to control or specify the desired frequency for the automatic frequency control).

A portion of the automatic frequency control circuitry that determines the difference in frequency between a specified center channel frequency and an actual center channel frequency for a received RF signal is formed within the baseband circuitry in the described embodiment of the invention. This portion of the circuitry includes circuitry that coarsely measures the frequency difference and then measures the frequency difference in the digital domain to obtain a more precise measurement and to produce frequency correction inputs to circuitry portion 124B. Finally, radio circuitry portion 124C includes low pass filtration circuitry for removing any interference that is present after baseband processing as well as amplification, mixer and up-converter circuitry for preparing a baseband signal for transmission at the RF.

The baseband processor or digital block, as shown in FIG. 4, includes logic for the frequency control as discussed above in addition to data processing logic. The digital block further includes antenna placement logic which is operable to direct a user to orient an antenna as described in the various embodiments herein. Generally, however, the antenna placement logic direct the user to orient the antenna in one of a plurality of rotations and, for each rotation, records a maximum received signal strength (either for just one host or as an average of a plurality of hosts) as received from at least one of the RSSIs 148 and 152. After all rotations have been tested for signal strength, the antenna placement logic is operable to direct the user to a "permanent" orientation.

Figure 5:
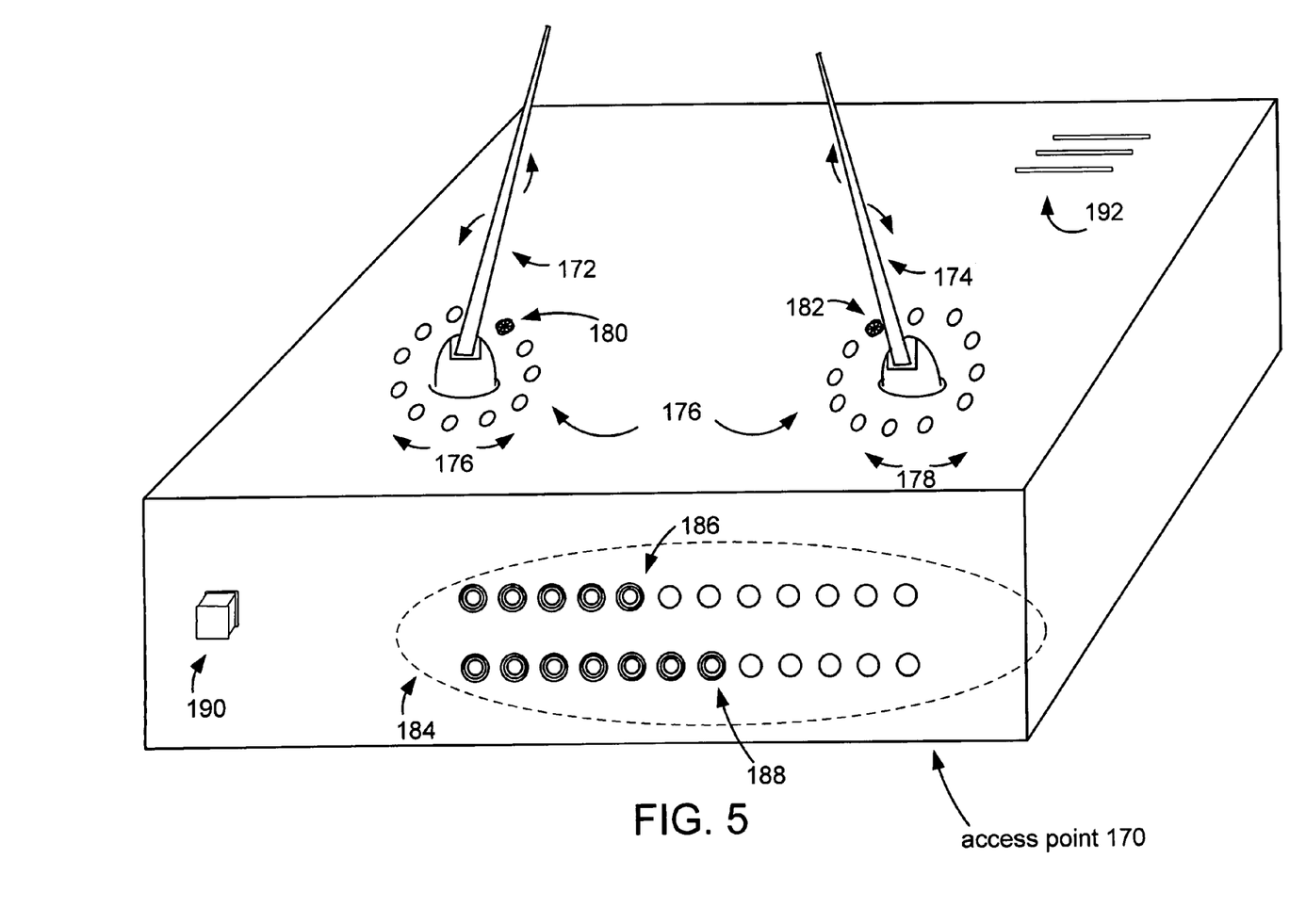
FIG. 5 is a perspective view of an access point formed to operate according to an alternate embodiment of the present invention.

FIG. 5 is a perspective view of an access point formed to operate according to an alternate embodiment of the present invention. Access point 170 includes traditional and new access point circuitry and logic as illustrated with reference to FIG. 2. Additionally, access point 170 includes a first set of lights 176 that correspond to antenna rotational positions. In the described example, access point 170 includes two antennas 172 and 174. Accordingly, first set of lights 176 includes two groups of lights, one group corresponding to antenna 172 and the other group corresponding to antenna 174. As may be seen, antenna 172 is operable to rotate in a horizontal plane in clockwise and counterclockwise directions 177 while antenna 174 rotates in clockwise and counterclockwise directions 178 as with access point 100 of FIG. 3. As may further be seen, each group of lights of the first set of lights 176 circumvents a base of the corresponding antenna instead of being placed on a front panel of the access point as in access point 100 of FIG. 3. It may be seen that a light 180 is illuminated to prompt the user to rotate antenna 172 into the corresponding position as shown. Similarly, a light 182 is illuminated to prompt the user to rotate antenna 174 into the corresponding position as shown.

A second set of lights 184 is similar to the second set of lights 116 of access point 100 of FIG. 3 wherein each row or group of lights of the second set of lights reflects a signal strength indication for a corresponding antenna. A peak signal strength is reflected by the right most illuminated light 186 and 188 of the two groups of lights from the second set of lights 184.

In operation, as will be described in greater detail below, access point 170 illuminates a light in each group of lights of the first set of lights 176 to prompt a user to rotate the corresponding antenna into a specified rotation if the antenna is not already in the specified rotation. As will be described in greater detail below, the lights are used in one of two modes of operation (two steps in the inventive method) in which the lights initially prompt a user to rotate the corresponding antenna through a plurality of rotational positions as a part of determining a substantially optimal orientation for the corresponding antenna. After the substantially optimal orientation is determined, logic with the access point prompts the user to rotate the antenna (if necessary) as a part of directing a user to permanently place the antenna into a substantially optimal orientation. It is understood, of course, that the term "permanently" merely reflects an orientation for use of the access point until further testing for an optimal orientation is performed.

Additionally, it should be understood that the first set of lights 102 of FIG. 3 and the first set of lights 176 of FIG. 5 only indicate a rotational position of a test or permanent orientation. The other adjustment is the angular orientation of the antennas in an upwardly extending direction. Thus, for any given rotational position, the antennas may be pivoted in an upwardly extending plane. In the described embodiment, each group of lights of the second set of lights 184 reflects an overall signal strength for one or more wireless communication devices with which access point 170 is communicating, as with access point 100 of FIG. 3. For example, in one embodiment, if access point 170 is communicating with three host devices through antenna 172, light 186 reflects an average signal strength for received RF signals transmitted by each of the wireless host devices. Similarly, light 188 reflects an average signal strength for host devices in communication with access point 170 by way of antenna 174. For each group of lights of the second set of lights 184, more or less lights are illuminated to correspond to the average received signal strength of communications received through the corresponding antenna. Thus, each group of the second set of lights 184 will reflect an average signal strength as the antenna is pivoted about a pivot point to enable the user to determine a substantially optimal upwardly extending planar position about the pivot point for a given rotation for communicating with a single host device or a plurality of host devices.

Access point 170 further includes a push button switch 190 to initiate procedures to determine substantially optimal antenna orientations and further to indicate, during said procedures, that the user is ready to proceed to a next step of the procedures. Accordingly, if the procedures for determining substantially optimal antenna positions are not in progress, depression of switch 190 initiates the procedures. If the procedures are in progress, in one embodiment of the invention, the depression of switch 190 is interpreted by logic within access point 170 that a new rotational position should be indicated. If the antenna(s) have been rotated through all possible positions, depression of switch 190 is interpreted as being an indication that access point 170 should provide an indication of the substantially optimal antenna rotations for permanent placement using the first set of lights 176.

As yet another aspect of the embodiment of access point 170, a speaker 192 is provided within the packaging as shown as a user feedback device to advise that access point 170 is ready to proceed to a next step in the procedure or to otherwise alert the user. For example, because the access point is required to received an adequate amount of communication signals from a plurality of hosts or wireless communication devices, testing of the communication channels may take a substantial amount of time for accurate determinations to be made. Alternatively, a speaker may be utilized to provide an indication of an optimal upwardly extending orientation for an antenna.

Access point 170, when said procedures are initiated by depression of switch 190 or by other methods, initiates test communications with all detected wireless communication devices or hosts. Accordingly, each host is prompted to generate wireless communications that access point 170 is operable to evaluate for signal strength or other metric. Thus, access point 170 specifically includes defined logic for initiating such test procedures with other hosts or wireless communication devices. As one aspect of the embodiment of the invention, depression of switch 190 causes access point 170 to initiate communications with host devices (including test communications) to receive and measure signal strengths for a given antenna position.

Figure 6A:
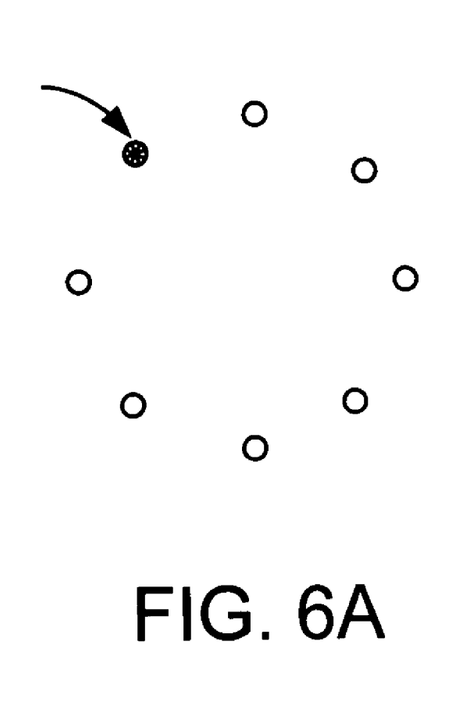
FIGS. 6A and 6B are functional illustrations of alternate light arrangements according to alternate embodiments of the present invention.
Figure 6B:
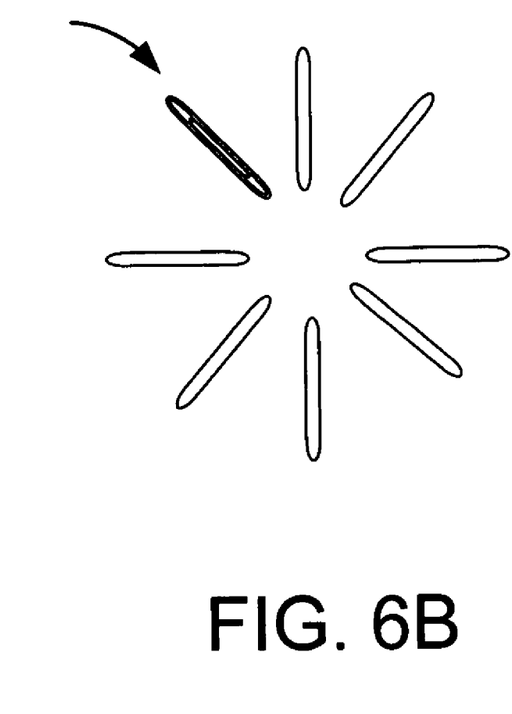

FIGS. 6A and 6B are functional illustrations of light arrangements according to alternate embodiments of the present invention. More particularly, one notable point is that twelve lights found in the first set of lights of access points 100 and 170 may be reduced to a smaller number of lights including, as shown here in FIGS. 6A and 6B, a total of eight lights. In other embodiments, six or four lights may be used. Generally, reducing the number of lights corresponds to a reduced number of steps for determining a substantially optimal antenna rotation. A drawback, however, is that using a reduced number of steps increases a possibility that an antenna rotation is not as optimal as it might have been with more resolution resulting from a greater number of lights and associated test steps. Finally, as shown in FIG. 6B, other styles of light may be used.

Figure 7:
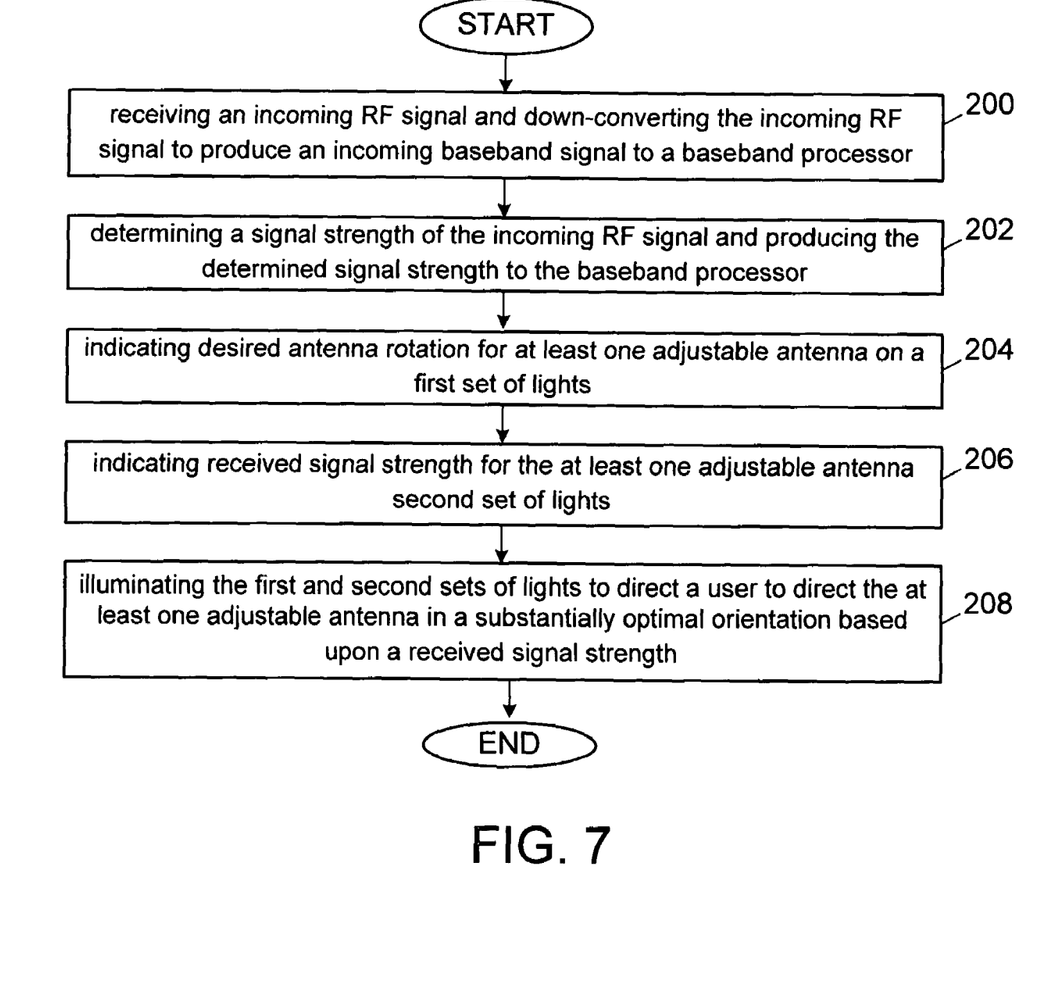
FIG. 7 is a flowchart illustrating a method according to a first embodiment of the present invention for determining and providing an indication of a substantially optimal antenna placement for communicating with a plurality of host devices.

FIG. 7 is a flowchart illustrating a method according to a first embodiment of the present invention for determining and providing an indication of a substantially optimal antenna placement for communicating with a plurality of host devices. Initially, the method includes receiving an incoming RF signal and down-converting the incoming RF signal to produce an incoming baseband signal to a baseband processor (step 200). The received signal may be either ongoing communications or test communications made in response to a prompt from an access point executing the method of the present embodiment of the invention. Thereafter, the inventive method includes determining a signal strength of the incoming RF signal and producing the determined signal strength to the baseband processor (step 202). The second signal strength may reflect signal and noise or, alternatively, merely the signal, as was discussed in relation to FIG. 4. Additionally, the method includes indicating a desired antenna rotation for at least one adjustable antenna on a first set of lights (step 204). For the described embodiments in FIGS. 3 and 5 having two antennas and groups of lights that correspond to each antenna, the method includes illuminating first and second sets of lights to prompt a user to adjust first and second adjustable antennas in a horizontally planar direction (to rotate each antenna to a specified rotational position or orientation).

It is presumed that a user of the described embodiment of the present invention will adjust the antenna in an upwardly extending planar direction while monitoring an indication of received signal strength to orient the antenna in a manner that provides substantially maximum received signal strength. Thus, from the perspective of the access point, the inventive embodiment includes indicating the received signal strength for the at least one adjustable antenna with a second set of lights (step 206). In the case of multiple antennas, the method of step 206 includes illuminating the first and second groups of lights in the second set of lights to prompt the user to adjust first and second adjustable antennas in an upwardly extending planar direction. The above steps are repeated until the antenna has been rotated through all positions. The method according to the described embodiment thus finally includes illuminating the first and second sets of lights to direct a user to direct the at least one adjustable antenna in a substantially optimal orientation based upon a received signal strength (step 208). The received signal strength indicated on the second set of lights reflects a substantially maximum signal strength for a plurality of communication devices communicatively coupled with the access point in the described embodiment of the invention. Thus, this step includes providing an indication of rotational and planar orientation that substantially maximizes a received signal strength for a plurality of communication devices communicatively coupled with the access point through the first and second adjustable antennas.

Figure 8:
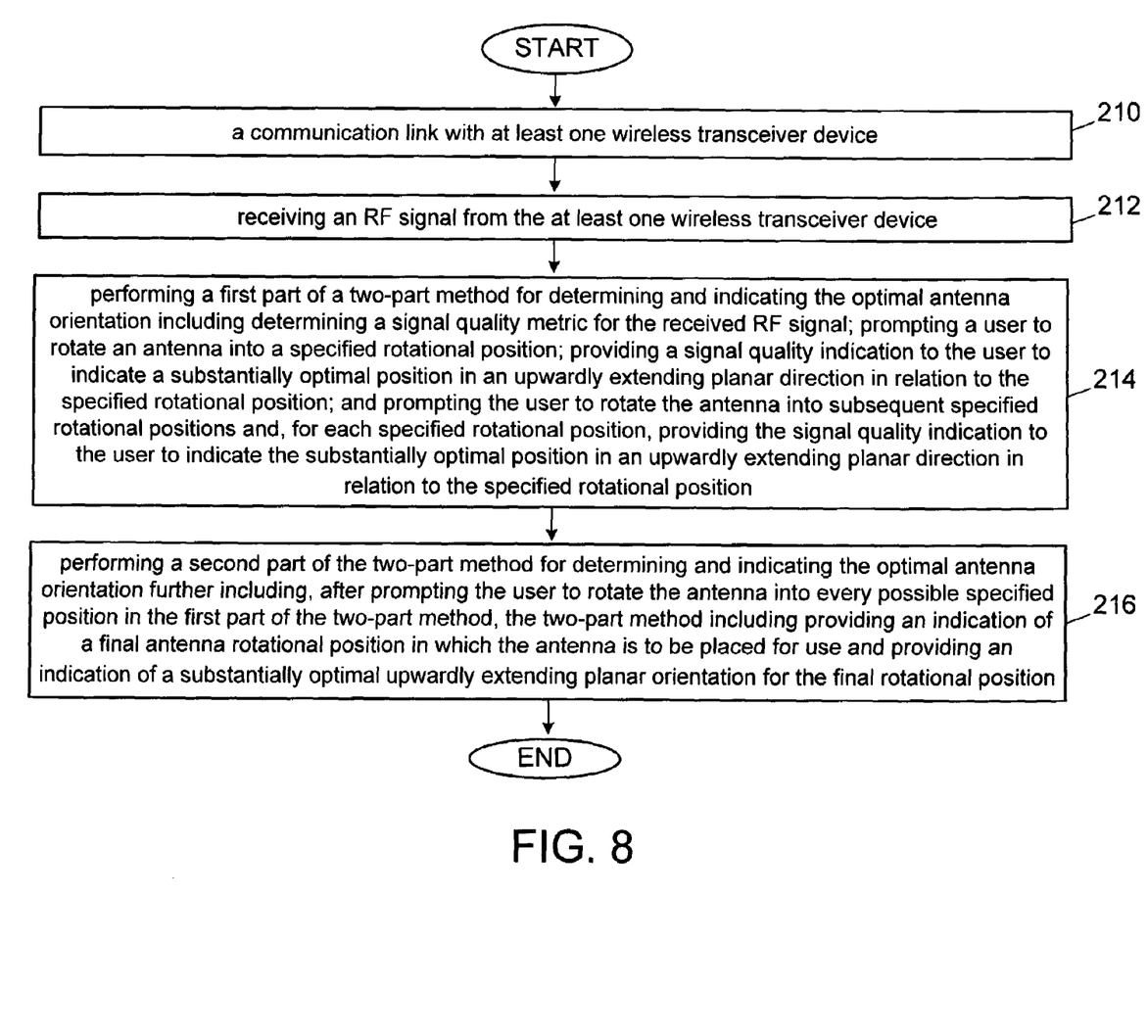
FIG. 8 is a flowchart illustrating a method for determining and indicating an optimal antenna orientation on a wireless receiver according to an alternate embodiment of the present invention.

FIG. 8 is a flowchart illustrating a method for determining and indicating an optimal antenna orientation on a wireless receiver according to an alternate embodiment of the present invention. Initially, the invention includes establishing a communication link with at least one wireless transceiver device (step 210) and receiving an RF signal from the at least one wireless transceiver device (step 212). Thereafter the method includes performing a first part of a two-part method for determining and indicating the optimal antenna orientation (step 214). This part further includes determining a signal quality metric for the received RF signal, prompting a user to rotate an antenna into a specified rotational position, providing a signal quality indication to the user to indicate a substantially optimal position in an upwardly extending planar direction in relation to the specified rotational position and prompting the user to rotate the antenna into subsequent specified rotational positions and, for each specified rotational position, providing the signal quality indication to the user to indicate the substantially optimal position in an upwardly extending planar direction in relation to the specified rotational position. The signal quality metric is a received signal strength in one embodiment. In an alternate embodiment, the signal quality metric is one of a bit error rate, a frame error rate or a signal to noise ratio. Moreover, the signal quality metric reflects signal quality for a plurality of communication links.

The methods according to the various embodiments of the present invention include, for some embodiments of access points, providing a specified amount of time for a user to rotate the antenna from one position to another. Similarly, the methods include providing a specified amount of time for a user to pivot the antenna in an upwardly extending direction to determine a substantially optimal orientation. As an alternate approach to using time between steps, one embodiment includes waiting for a specified user response prior to indicating a new position for the antenna rotation. For example, as shown in FIG. 5, access point 170 includes a switch to prompt the access step to proceed to a next step in the process. During this first step, the second set of lights reflect instantaneous signal strength for received test or communication signals as the user pivots a corresponding antenna about a pivot point.

The second and final step of the described embodiment of the invention includes performing a second part of the two-part method for determining and indicating the optimal antenna orientation further including, after prompting the user to rotate the antenna into every possible specified position in the first part of the two-part method, providing an indication of a final antenna rotational position in which the antenna is to be placed for use and further providing an indication of a substantially optimal upwardly extending planar orientation for the final rotational position (step 216). According to one aspect of the present invention, the second set of lights reflect instantaneous signal strength for a period of time to enable the user to determine a substantially optimal antenna orientation and, thereafter, reflect a maximum signal strength for a last received data communication. Such period of time may be specified or may be limited according to operation. For example, the second set of lights may reflect instantaneous signal strength for test communication signals only. In one embodiment, one of a tone or a specified light condition is used to indicate that the antenna is in a substantially optimal orientation wherein, if a tone is used, the tone is produced through a speaker of the access point. Thus, this embodiment is only applicable to an access point similar to access point 170 that includes a speaker and circuitry for generating a tone.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A wireless access point comprising:
   a receiver section that is configured to receive an incoming RF signal, and wherein the receiver section down-converts the incoming RF signal to produce an incoming baseband signal and wherein the receiver section is configured to determine a received signal strength;
   a transmitter section that is configured to receive an outgoing baseband signal, and wherein the transmitter section up-converts the outgoing baseband signal to produce an outgoing RF signal;
   at least one adjustable antenna;
   a first set of lights for indicating desired antenna rotation for the at least one of the adjustable antenna wherein the first set of lights further comprises first and second groups of lights to indicate a rotational position for the first and second adjustable antennas, respectively, into which a user is to place the first and second adjustable antennas;
   a second set of lights for indicating received signal strength for the at least one adjustable antenna wherein a number of illuminated lights increases as signal strength increases;
   wherein the first and second groups of lights are circularly orientated;
   a logic coupled to activate the first and second sets of lights to direct a user to direct the at least one adjustable antenna in a substantially optimal orientation based upon the received signal strength;
   first and second adjustable antennas that are adjustable in a horizontally planar direction and in an upwardly extending planar direction; and
   wherein the first set of lights comprises first and second groups of lights for indicating antenna orientation for the first and second adjustable antennas, respectively.

2. The wireless access point of claim 1 wherein the first and second groups of lights indicate a rotational position for which the received signal strength is substantially optimized for the first and second adjustable antennas, respectively.

3. The wireless access point of claim 1 wherein the second set of lights comprises first and second rows of lights for indicating received signal strength on the first and second adjustable antennas, respectively.

4. The wireless access point of claim 3 wherein the received signal strength reflects a substantially maximum signal strength for a plurality of communication devices communicatively coupled with the wireless access point.

5. The wireless access point of claim 4 wherein the first and second groups of lights provide an indication of rotational and planar orientation that substantially maximizes the received signal strength for the plurality of communication devices communicatively coupled with the wireless access point through the first and second adjustable antennas.

6. In a Radio Frequency (RF) transceiver access point, a method for determining and providing an indication of a substantially optimal antenna placement for communicating with a plurality of host devices, comprising:
   receiving an incoming RF signal and down-converting the incoming RF signal to produce an incoming baseband signal to a baseband processor;
   determining a signal strength of the incoming RF signal and producing the determined signal strength to the baseband processor;
   indicating desired antenna rotation for at least one adjustable antenna on a first set of lights;
   indicating received signal strength for the at least one adjustable antenna on a second set of lights by increasing a number of illuminated lights based upon the received signal strength; and
   illuminating the first and second sets of lights to direct a user to direct the at least one adjustable antenna in a substantially optimal orientation based upon a received signal strength wherein illuminating the first and second set of lights further includes:
   illuminating the first and second sets of lights to prompt a user to adjust first and second adjustable antennas in a horizontally planar direction; and
   illuminating the first and second sets of lights to prompt the user to adjust first and second adjustable antennas in an upwardly extending planar direction;
   providing an indication to the user of a rotational position for the first and second adjustable antennas, respectively, into which a user is to place the first and second adjustable antennas;
   indicating a rotational position for which a received signal strength is substantially optimized for at least one of the first and second adjustable antennas, respectively.

7. The method of claim 6 wherein the received signal strength reflects a substantially maximum signal strength for a plurality of communications devices communicatively coupled with the RF transceiver access point.

8. The wireless access point of claim 4 wherein the second set of lights comprises first and second rows of lights for indicating received signal strength on the first and second adjustable antennas, respectively.

9. A method for determining and indicating an optimal antenna orientation on a wireless receiver, comprising:
   establishing a communication link with at least one wireless transceiver device;
   receiving an RF signal from the at least one wireless transceiver device;
   performing a first part of a two-part method for determining and indicating the optimal antenna orientation further including:
   determining a signal quality metric for the received RF signal;
   prompting a user to rotate an antenna into a specified rotational position;
   providing a signal quality indication to the user to indicate a substantially optimal position in an upwardly extending planar direction in relation to the specified rotational position; and
   prompting the user to rotate the antenna into subsequent specified rotational positions and, for each specified rotational position, providing the signal quality indication to the user to indicate the substantially optimal position in an upwardly extending planar direction in relation to the specified rotational position; and performing a second part of the two-part method for determining and indicating the optimal antenna orientation further including, after prompting the user to rotate the antenna into every possible specified position in the first part of the two-part method, the two-part method including:

providing an indication of a final antenna rotational position in which the antenna is to be placed for use; and providing an indication of a substantially optimal upwardly extending planar orientation for the final rotational position.

10. The method of claim 9 wherein the signal quality metric is a received signal strength.

11. The method of claim 9 wherein the signal quality metric is one of a bit error rate or a frame error rate.

12. The method of claim 9 wherein the signal quality metric is one of signal to noise ratio.

13. The method of claim 9 wherein the signal quality metric reflects signal quality for a plurality of communication links.

14. The method of claim 13 wherein the final rotational position is one that provides a substantially best signal quality for the plurality of communication links.

15. The method of claim 9 further including providing a specified amount of time for a user to rotate the antenna from one position to another.

16. The method of claim 9 further including providing a specified amount of time for a user to pivot the antenna in an upwardly extending direction to determine a substantially optimal orientation.

17. The method of claim 16 wherein one of a tone or a specified light condition is used to indicate that the antenna is in a substantially optimal orientation.

18. The method of claim 9 further including waiting for a specified user response prior to indicating a new position for the antenna rotation.

* * * * *